3,163,788
SYNCHRONOUS INDUCTOR MOTOR INCLUDING AN ELECTRICALLY CONDUCTIVE COATING ON THE ROTOR
Wesley R. Powers, Fort Wayne, Ind., assignor to General Electric Company, a corporation of New York
Filed May 8, 1961, Ser. No. 108,417
6 Claims. (Cl. 310—45)

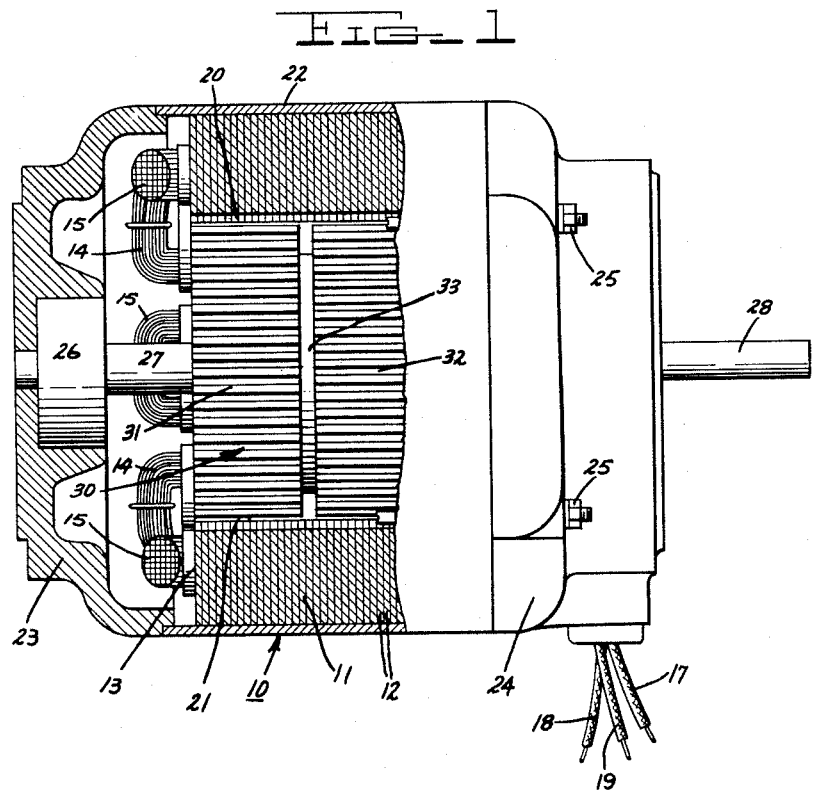

This invention relates in general to dynamoelectric machines, and more particularly to an improved permanent magnet type rotor construction especially suitable for use in a capacitor split phase synchronous inductor motor.

There are many applications for electric motors where a relatively slow constant predetermined speed and direction of rotation are of paramount importance. For instance, timing devices, missile guidance mechanism, phonographs, counters and other kinds of indicating equipment are typical of the applications in which these qualities are essential. A classic variety of motors having the desired basic characteristics for driving such equipment is the so-called alternating current synchronous inductor motor, which is generally characterized by a relatively low efficiency (i.e., below 30%) and load driving capacity, as evidenced for instance, by its low breakdown torque. Breakdown torque is the maximum torque which is developed with rated voltage applied at rated frequency without an abrupt drop in speed or loss of synchronism, and is directly affected by the winding current phase splitting means of the motor.

A typical motor of this type includes a stator core formed with a plurality of angularly spaced magnetic salient poles, each of which includes a number of evenly spaced teeth about the periphery of the pole. Two alternating current phase winds, i.e., primary and auxiliary, are normally provided, with each winding being arranged on every other pole and energized from a single phase supply. This arrangement produces a space phase in the stator winding currents, which are also conventionally displaced from each other in time phase by the use of such circuitry as series capacitors for starting and running purposes. The rotatable member or rotor core incorporates a permanent magnet to provide a unidirectional flux therein and is normally formed with evenly spaced teeth on its peripheral surface. The number of rotor teeth determine the speed of rotation for a given frequency, while the different instantaneous displacements between the rotor and stator teeth and their respective M.M.F.'s cause rotation of the rotor. The theory of operation and general construction of such motors are thoroughly described in the prior art Patents 2,105,513 and 2,122,307, both issued to A. F. Welch and assigned to the assignee of the present invention.

While the synchronous inductor motor normally starts operation and runs in the direction in which both the magnetic torque pulses per cycle and polarity of poles progress around the stator core (the planned direction of rotation), there is a tendency under certain conditions, primarily determined by the relative positions of the stator and rotor teeth and the instantaneous value of the applied A.C. voltage wave at the instant the motor is energized, for the motor to start in the direction opposite to that desired and to behave, in effect, as a weak straight single phase inductor motor. This tendency or possible condition, referred to by those skilled in the art as "backward torque," is in many situations undesirable and is especially critical for light load applications where the existence of even relatively little backward torque could control and influence the rotor rotation in a direction other than that desired. For example, where the motor is employed to drive an indicator device, such as a comparatively light load chart indicator, backward torque of a small magnitude, causing reverse rotation, results in a false reading.

Consequently, in an effort to eliminate backward torque without unnecessarily decreasing the breakdown torque of the motor, several approaches have been suggested, none of which has proven to be entirely satisfactory for one reason or another. For instance, it has been proposed that a clutch or unidirectional ratchet mechanism be provided between the motor and the driven device to insure rotation in the planned direction. However, this not only increases the expense of building the motor, but in addition adds weight to the driven load. Another problem with this approach is the fact that it is totally unsuitable for those situations which require an extremely light weight motor capable of providing planned rotation in either direction at a predetermined speed to drive relatively light loads; e.g., reversible type motor for missile guidance systems where no backward torque is permissible whatsoever.

Thus, it is most desirable to provide a highly economical synchronous inductor motor which does not need unidirectional clutch mechanisms to eliminate objectionable backward torque, yet one which can perform at exact relatively low speeds always in the planned direction of rotation without a sacrifice in output of the motor in relation to its size.

It is, therefore, an object of this invention to provide an improved synchronous inductor motor which operates at relatively low exact speeds.

It is a further object of the present invention to provide an improved low cost self-excited synchronous inductor motor, having at least two windings, which is capable of satisfactory operation when using inexpensive wide toleranced capacitors for phase split purposes without permitting objectionable backward torque to influence and control the direction of rotation, even for no load or relatively light load condition.

It is still a further object of the invention to provide an improved rotor having a magnet, which is especially suitable for use in synchronous inductor motors.

It is another object of this invention to provide an improved, yet simply constructed, low-cost rotor incorporating a magnet therein, particularly suitable for use in a self-excited synchronous inductor motor, which may be accurately manufactured and will always operate in the planned direction of rotation without requiring unidirectional devices, such as clutch mechanisms or the like.

In carrying out the objects in one form thereof, I provide an improved synchronous inductor motor in which a stator, having a primary and auxiliary winding arranged thereon with a capacitor for splitting the phase between the winding current, has a plurality of poles formed with teeth defining a rotor receiving bore. The rotor, carried by a shaft for rotation relative to the stator, includes a permanent magnet mounted on the shaft, polarized axially and at least one substantially cylindrical member provided in touching relation with one end face of the magnet. The cylindrical member has a unitary magnetic core formed with a plurality of evenly spaced teeth around its peripheral surface and a layer of conductive non-magnetic material disposed between the teeth and electrically short circuited on each end of the core. With this highly economical construction, the synchronous inductor motor is capable of utilizing a wide toleranced capacitor for phase splitting purposes, and without employing any unidirectional clutch device, always operates with a satisfactory load carrying ability in the planned direction of rotation at an exact relatively slow speed.

The features of the invention which are believed to be novel are set forth with particularity in the appended claims. The invention itself, however, together with further objects and advantages thereof, may best be understood by reference to the following description taken in connection with the accompanying drawing.

In the drawing:

FIG. 1 is a side view, partly broken away and partly in cross section, of a synchronous inductor motor including the improved construction of this invention in one form thereof;

FIG. 2 is a side view in cross section of the improved rotor assembly of this invention;

FIG. 3 is a partial end view, partly broken away, of the rotor assembly of FIG. 2 to illustrate detail; and FIG. 4 is a schematic wiring diagram for the operation of the synchronous inductor motor of FIG. 1.

Referring now to FIG. 1 of the drawing, for purposes of illustration only, I have shown the preferred embodiment of my invention incorporated in an alternating current reversible, capacitor permanent split-phase self-starting synchronous inductor motor, generally indicated by numeral 10. The motor includes a standard stationary primary member or stator 11 having a unitary core formed of a stacked plurality of relatively thin laminations 12 composed of magnetic material. In the embodiment of FIG. 1, the stator has a total of eight polar salients or poles 13 (five being shown) with two phase windings, a primary 14 and an auxiliary 15, each having coils conventionally arranged on alternate poles so that four poles are wound with coils of the primary winding 14 and the other four poles are wound with coils of auxiliary winding 15 to provide four pole operation. The windings may be connected to a suitable alternating current power source of a predetermined frequency (usually 60 cycles per second) through external leads or conductors 17, 18, and 19.

The stator poles are provided with evenly spaced apart teeth 20 cut in their faces, the outer peripheral surfaces of the teeth together defining a rotor receiving bore 21 in the usual manner. Stator 11 is mounted within a motor frame, which for convenience of assembly is shown comprised of a cylindrical shell 22, surrounding stator 11, whose ends are closed by a pair of flanged end shields 23 and 24. The end shields 23 and 24 and shell 22 may be secured together by any suitable means, such as, for instance, through bolts 25. Bearing means, generally identified at 26, are provided in each end shield to support a rotatable shaft 27, having an end 28 extending through end shield 24 externally of the motor, which in turn carries the secondary member or rotor 30 within bore 21.

Rotor 30 in its preferred form includes two axially spaced apart unitary annular members 31 and 32, and a substantially cylindrical permanent magnet 33, which is polarized axially so that the poles of the magnet are located at each end face thereof. As illustrated most clearly in FIG. 2, preferably, members 31 and 32 are identical in configuration and construction, each having a solid core 34 provided with a central shaft receiving hole 35 and a plurality of equispaced grooves 36 which form between the teeth 37 around its peripheral surface. The outer side face or wall 39 of the core, as illustrated, is relatively flat and made substantially perpendicular to the axis of hole 35, while inner side face 40 is provided with a recess defined by walls 41 and 42, the latter wall tapering outwardly from wall 41 toward the periphery of the core. Core 34 may conveniently be formed by compressing and sintering magnetic powder material, such as sintered electrolytic iron, into the desired shape.

With reference to FIGS. 2 and 3, it will be observed that members 31 and 32 are each provided with a substantially uniform surface coating or layer 44 of electrically conductive non-magnetic material, such as copper, in grooves 36 and on walls 39, 40 and 42 of core 34, the conductive material on the walls electrically joining together in short circuit relation, layer 44 disposed in grooves 36. In viewing FIG. 3, it will be appreciated that the outer surfaces 45 of the rotor teeth 37, which is not covered by layer 44, will, in effect, form exposed poles entirely surrounded by the conductive material. It has been found that in actual practice, to obtain the benefits set out below of the present invention, layer 44 should be at least 0.002 inch in thickness, preferably in the order of 0.005 inch. Layer 44 may be readily applied to the members after cores 34 have been sintered, by electrodepositing or plating side walls 39, 40 and 42 as well as the entire outer peripheral surface of the members with the conductive material, and thereafter removing it from surface 45 of the rotor teeth 37, as by a standard grinding operation.

Members 31 and 32 are positioned on shaft 27 with the teeth of one member being angularly offset with respect to the other (FIG. 1) and axially spaced therefrom to limit passage of flux in that area resulting from magnet 33. Further, the recesses of the respective members are in facing relation to furnish an enclosure 46 for accommodating magnet 33, such that the end faces of the magnet abut core walls 41. The component parts of the rotor are caused to rotate with shaft 27 as a single unit by any suitable means. For example, the central hole 47 of magnet 33 may have a loose fit with the shaft, and members 31 and 32, fixedly mounted onto the shaft by an interference fit therewith and in tight engagement with the end faces of the magnet, secure the magnet to the shaft.

I have found that a synchronous inductor motor incorporating my invention, such as that of the preferred embodiment described above, despite its simplicity and economy of construction and even though standard low cost commercially available capacitors having wide tolerances are employed as the winding current phase-splitting means, the motor is capable of satisfactory operation at relatively low exact speeds and is entirely devoid of undesirable backward torque. These advantageous features may be better appreciated and understood by a comparison of the operating characteristics of a synchronous inductor motor, built in accordance with the preferred embodiment previously described (hereinafter referred to as motor A), with the characteristics of a motor which does not include the present invention (motor B). Basically, the only difference in construction between tested motors A and B was the provision of a conductive layer 44 of copper 0.005 inch thick on the rotor members 31 and 32 in the manner set out above, both motors using the same stator 11 for the tests.

For the sake of convenience, the numbers used herein to identify the component parts of synchronous inductor motor 10 will be employed in describing the dimensions of tested motors A and B. More specifically, stator 11 was of the well-known 50 frame size having an axial stack length of 1.25 inches, an outer diameter of four inches, and eight polar salients 13, each having five teeth to define a bore 21 of 2.34 inches in diameter. The stator was wound with windings 14 and 15 to provide four pole reverse direction operation (FIG. 1). As seen in the schematic wiring diagram of FIG. 4, a series capacitor 50 (to be described more in detail hereinafter) and a resistor 51 (175 ohms) were connected across the windings which, in turn, were energized from an alternating current 60 cycle source of power 52 through lines 53 and 54 and reversing switch 55 thereby providing a reversible permanent split-phase capacitor starting and running arrangement well understood in the art.

Rotor 30 for each motor included a 0.5 inch shaft 27 and an Alnico permanent magnet 33 having an outer diameter of 1.5 inches and a width of 0.875 inch. Sintered core 34 for identical members 31 and 32 respectively included forty-eight teeth 37 providing a 0.007 inch air gap with the stator 11. In addition, core teeth 37, measured between walls 39 and 40, were each 0.675 inch in length and 0.062 inch wide. As mentioned previously, the rotor for motor A included a 0.005 inch copper layer 44. The motors under consideration were tested with the same power input supplied to stator 11, that is, 120 volts, 0.368 amperes, and approximately 44.5 watts, and operated at a constant synchronous speed of seventy-five revolutions per minute.

Since backward torque has its greatest affect on direction of rotation at extremely light loads, the tests were conducted under no load conditions. In order to determine whether or not backward torque existed over an extended capacitor range, a well known decade type capacitor box, calibrated in increments of 0.1 microfarad (mfd.), was connected as capacitor 50 in FIG. 4 and at each capacitor value over an extended range, rotor 30 was rotated by hand against the planned direction of rotation as controlled by switch 55 in FIG. 4. For example, assuming that switch 55 is in the position indicated in FIG. 4 (connecting conductors 19 and 54), energizing windings 14 and 15 to produce a clockwise rotation of the rotor, the rotor 30 was turned by hand in a counterclockwise direction. If after discontinuance of the hand operation, the rotor continued to rotate counterclockwise (other than the planned direction of rotation), then backward torque existed which controlled the rotation in spite of the position of control switch 55.

The following tabulation shows and compares the performance characteristics of motor A, which incorporated the present invention, with that of motor B, which did not:

| Motor | Maximum breakdown torque in oz. in. at 75 r.p.m. with a 3.8 mfd. capacitor (50) (Column a) | Capacitor (50) ranges for no backward torque under no load conditions | |
|---|---|---|---|
| | | Minimum mfd. (Column b) | Maximum mfd. (Column c) |
| A | 156 | 3.3 | 5.7 |
| B | 166 | 3.8 | 5.1 |

For a motor of the type and size employed in these tests, the best performance under running conditions is obtained when an optimum phase-split is provided at breakdown torque between the primary and auxiliary winding currents; e.g. equal phase ampere turns and a 90° electrical phase split therebetween at synchronous speed. Theoretically, a capacitor of approximately 3.8 microfarads (see column a above) produces this optimum situation. It will be observed in the above table, from a comparison of columns b and c, that backward torque did not exist in motor A (which included my invention), from a minimum capacitor value of 3.3 microfarads (mfd.) to a maximum of 5.7 mfd. Consequently, a low cost commercially available nominal 4.0 mfd. capacitor having a ±10% tolerance; i.e., 3.6 mfd. to 4.4 mfd., may be readily utilized to approximate the ideal optimum winding current phase-split situation in motor A, which not only is free of backward torque at the low constant speed of 75 r.p.m. but also has a high and completely satisfactory breakdown torque ( column a). On the other hand, motor B, which experiences backward torque when using a capacitor having a value under 3.8 mfd., cannot utilize the nominal 4.0 mfd. capacitor, with its possible minimum of 3.6 mfd., and still always operate in the planned direction.

Another advantage of the present invention is the possibility of utilizing the correct capacitor size to produce the optimum phase-split without backward torque for a given driven load requirement. Taking the 50 frame motor size of the examples previously described, the capacitor required for optimum phase-split and synchronous torque conditions, varies from a minimum of 3.4 mfd. (at no load) to the maximum of 3.8 mfd. (at maximum breakdown torque, column a in the table). Consequently, a capacitor may be selected, having a value within the ideal capacitor range (3.4–3.8), and used satisfactorily with a motor incorporating my invention. However, a synchronous inductor motor such as motor B, which experiences backward torque below 3.8 mfd. (column b), could not employ a capacitor below that 3.8 mfd. value without, at the same time, exhibiting the adverse affects of backward torque.

The advantageous and desirable features of my invention are readily manifest from the foregoing. Among other things, it is now possible, with the use of my invention, to provide an inexpensive synchronous inductor motor which will always operate satisfactorily in the planned direction of rotation at exact speeds even though a commercially available low-cost wide toleranced capacitor is used for winding current phase-splitting purposes and the motor is operated under relatively light load conditions. Further, the motor is light in weight and capable of rotation in either direction, if so desired, without being influenced or controlled by objectionable backward torque.

It should be apparent to those skilled in the art, while I have shown and described what at present is considered to be the preferred embodiment of my invention in accordance with the patent statutes, changes may be made in the structure disclosed without actually departing from the true spirit and scope of this invention, and I therefore intend to cover in the following claims all such equivalent variations as fall within the invention.

What I claim as new and desire to secure by Letters Patent of the United States is:

1. An alternating current synchronous inductor motor operable in a selected direction of rotation comprising a stator having a plurality of poles extending inwardly terminating in teeth to define a rotor receiving bore and having windings arranged on said poles; a rotor disposed in said bore formed to minimize the backward torque characteristics of the motor comprising a shaft, a cylindrical permanent magnet mounted on the shaft and polarized axially, at least one substantially cylindrical member mounted on the shaft with an end face in abutting relation to the side of said magnet, said member including a core formed of magnetic material with spaced apart teeth provided entirely around its periphery, a layer of conductive material disposed between said teeth, and conductive material electrically joining said layers together on each side of said teeth, said rotor tending to prevent backward torque from controlling rotor rotation during inductor starting conditions thereby assuring operation of the motor in the selected direction.

2. In an alternating current synchronous inductor motor operable in a selected direction of rotation including a stator having a plurality of poles extending inwardly with teeth formed on the inner periphery to define a bore, and windings arranged on said poles; a rotor disposed in the bore formed to reduce backward torque characteristics of the motor comprising a shaft, a magnet mounted on the shaft, a pair of members mounted on the shaft, each member having an end face in substantially touching engagement with the side of said magnet and including a solid core formed of magnetic material with spaced apart teeth on its peripheral surface, a layer of conductive material disposed between said teeth on the surface of said core, and conductive material electrically joining the layers together on each side of said teeth, said rotor tending to prevent backward torque from controlling rotor rotation during inductor starting thereof thereby assuring operation in the selected direction.

3. In an alternating current synchronous inductor motor operable in a selected direction of rotation including a stator having a plurality of salient poles extending inwardly with teeth formed on the inner periphery to define a rotor receiving bore and windings arranged on said poles; a rotor disposed in the bore formed to reduce backward torque characteristics of the motor comprising a shaft, a cylindrical permanent magnet mounted on the shaft and polarized axially, two substantially identical members mounted on the shaft with each having a recess formed on its sides facing the other member, said magnet being arranged in said recess in substantially touching engagement with each member, each member including a solid core formed of sintered magnetic material with evenly spaced apart teeth on its periphery, a layer of non-magnetic conductive material disposed between said teeth on the surface of said core, and a layer of non-magnetic conductive material electrically joining the layers between the teeth together on each side of said core, said latter layer being disposed outwardly from said magnet on the side of said core having the recess formed therein, said rotor tending to prevent backward torque from controlling rotor rotation during starting thereof thereby assuring operation in the selected direction.

4. An alternating current synchronous inductor motor operable in a selected direction of rotation comprising: a stator having a primary magnetic core including a plurality of spaced salient poles formed with a preselected number of inwardly projecting teeth on the pole faces thereof to define a rotor receiving bore; said stator further having winding means for producing alternating current fluxes between different salient poles; a rotor arranged in the bore formed to reduce backward torque characteristics of the synchronous inductor motor, said rotor having at least one secondary magnetic core and a permanent magnet having one face thereof disposed in abutting relation to said secondary core, a plurality of spaced apart teeth provided on said secondary core around its peripheral surface so as to produce synchronous inductor motor action with the teeth of said salient poles when the motor is in operation; and layers of conductive material disposed between adjacent teeth of said secondary core and electrically joined together on each side of said secondary core teeth, said rotor tending to prevent backward torque from controlling rotor rotation during inductor starting conditions and assuring operation of the motor in the selected direction.

5. A low speed split-phase alternating current synchronous inductor motor self starting in a selected direction of rotation comprising: a stator having a primary magnetic core including a plurality of angularly spaced salient poles formed with a preselected number of inwardly projecting teeth on the pole faces thereof to define a rotor receiving bore; two windings on said stator and means including at least one capacitor of preselected value for splitting the phase between the current in the respective windings; a rotor arranged in the bore and minimizing the backward torque characteristics of the synchronous inductor motor, said rotor having at least one secondary magnetic core and a permanent magnet having a plurality of polarized faces with one face thereof disposed in abutting relation to said secondary core, a plurality of spaced apart teeth provided around the periphery of said secondary core so as to produce synchronous inductor motor action with the teeth of said salient poles when the motor is in operation; and layers of non-magnetic conductive material disposed on the surface between adjacent teeth of said secondary core and nonmagnetic conductive material electrically joining the layers together on each side of said secondary core teeth, said rotor preventing backward torque from controlling rotor rotation during inductor starting conditions for a given phase splitting capacitor range and assuring operation of the motor in the selected direction.

6. A low speed reversible permanent split-phase alternating current synchronous inductor motor capable of operation in either direction of rotation comprising: a stator having a primary magnetic core including a plurality of angularly spaced salient poles formed with a preselected number of inwardly projecting teeth on the pole faces thereof to define a rotor receiving bore; means including at least two windings on said stator and phase splitting means for producing alternating fluxes at said salient pole teeth and reverse direction of rotation for the motor; a rotor arranged in the bore adapted to reduce backward torque characteristics of the synchronous inductor motor, said rotor having at least one secondary magnetic core and a permanent magnet having one face thereof disposed in abutting relation to said secondary core, a plurality of spaced apart teeth provided on said secondary core entirely around its peripheral surface so as to produce synchronous inductor motor action with the teeth of said salient poles when the motor is in operation; and layers of conductive material disposed between adjacent teeth of said secondary core and electrically joined together on each side of said secondary core teeth, said rotor preventing backward torque from controlling rotor rotation during inductor starting conditions for a predetermined range of said phase splitting means thereby assuring operation of the motor in either direction as selected.

References Cited by the Examiner
UNITED STATES PATENTS

| | | | |
|---|---|---|---|
| 1,433,827 | 10/22 | Kimble | 310—211 |
| 1,607,287 | 11/26 | Laffoon | 310—211 X |
| 2,103,165 | 12/37 | Merrill | 310—163 |
| 2,105,513 | 1/38 | Welsh | 310—163 |
| 2,120,109 | 6/38 | Merrill | 310—156 |
| 2,387,073 | 10/45 | Harlacher | 310—211 |
| 2,442,626 | 6/48 | Tolson | 310—163 |
| 2,721,278 | 10/55 | Baumann | 310—44 |
| 2,763,052 | 9/56 | Elmer | 310—42 |
| 2,913,819 | 11/59 | Andreotti | 310—44 |
| 2,927,229 | 3/60 | Merrill | 310—211 |
| 2,929,946 | 3/60 | Aske | 310—266 |
| 2,931,929 | 4/60 | Snowden | 310—44 |

ORIS L. RADER, *Primary Examiner.*

MILTON O. HIRSHFIELD, *Examiner.*